United States Patent
Chen

(10) Patent No.: US 11,050,610 B2
(45) Date of Patent: Jun. 29, 2021

(54) REPORTING MASTER NODE RADIO LINK FAILURE

(71) Applicant: FG Innovation Company Limited, Tuen Mun (CN)

(72) Inventor: Hung-Chen Chen, Hsinchu (TW)

(73) Assignee: FG Innovation Company Limited, Tuen Mun (HK)

( * ) Notice: Subject to any disclaimer, the term of this patent is extended or adjusted under 35 U.S.C. 154(b) by 21 days.

(21) Appl. No.: 16/537,960

(22) Filed: Aug. 12, 2019

(65) Prior Publication Data
US 2020/0059395 A1     Feb. 20, 2020

Related U.S. Application Data

(60) Provisional application No. 62/718,520, filed on Aug. 14, 2018.

(51) Int. Cl.
*H04L 12/24*     (2006.01)
*H04W 76/38*     (2018.01)
(Continued)

(52) U.S. Cl.
CPC ......... *H04L 41/0631* (2013.01); *H04W 24/10* (2013.01); *H04W 76/18* (2018.02);
(Continued)

(58) Field of Classification Search
CPC ............ H04L 41/0631; H04L 43/0811; H04W 24/10; H04W 76/15; H04W 76/18; H04W 76/19; H04W 76/27; H04W 76/38
(Continued)

(56) References Cited

U.S. PATENT DOCUMENTS

2015/0334769 A1* 11/2015 Kim ..................... H04W 76/15
                                                           370/329
2016/0338136 A1* 11/2016 Zhang .................. H04W 36/30
(Continued)

FOREIGN PATENT DOCUMENTS

WO     2018128572 A1     7/2018

OTHER PUBLICATIONS

Interdigital Inc. Discussion on Handing Split SRB during SCG Failure 3GPP TSG-RAN WG2 Meeting #101, R2-1802818 Mar. 2, 2018 (Mar. 2, 2018) sections 2, 5.
(Continued)

*Primary Examiner* — Robert J Lopata
(74) *Attorney, Agent, or Firm* — ScienBiziP, P.C.

(57) ABSTRACT

Some of the present implementations provide a method for a user equipment (UE) for reporting a master node (MN) failure. The method, in some of the present implementations detects, at the UE, a failure in a radio link to the MN. The method determines whether the UE is configured with a split signaling radio bearer (SRB). The method then transmits an MN failure report to the MN using a secondary node (SN) path of the split SRB after determining that the UE is configured with the split SRB. The method of some of the present implementations maintains current measurement configurations received from the MN and the SN, and continues to perform measurements based on the configurations received from the MN and the SN after determining that the radio link to the MN has failed.

20 Claims, 8 Drawing Sheets

(51) Int. Cl.
  *H04W 76/19*  (2018.01)
  *H04W 76/18*  (2018.01)
  *H04W 76/27*  (2018.01)
  *H04W 24/10*  (2009.01)
(52) U.S. Cl.
  CPC ........... *H04W 76/19* (2018.02); *H04W 76/27* (2018.02); *H04W 76/38* (2018.02)
(58) Field of Classification Search
  USPC ...................................................... 370/225
  See application file for complete search history.

(56) References Cited

U.S. PATENT DOCUMENTS

| | | | |
|---|---|---|---|
| 2019/0045568 A1* | 2/2019 | Palat | H04W 76/27 |
| 2019/0166646 A1* | 5/2019 | Shih | H04W 72/04 |
| 2019/0289510 A1* | 9/2019 | Rugeland | H04W 36/30 |
| 2019/0356536 A1* | 11/2019 | Lee | H04L 41/0654 |
| 2020/0169899 A1* | 5/2020 | Xiao | H04W 76/27 |
| 2020/0260515 A1* | 8/2020 | Hashmi | H04W 8/24 |
| 2020/0260518 A1* | 8/2020 | Orsino | H04W 76/15 |

OTHER PUBLICATIONS

Ericsson Support of SRBs for NE-DC and NGEN-DC 3GPP TSG-RAN WG2 AH 1807, Tdoc R2-1809946 Jul. 6, 2018 (Jul. 6, 2018) sections 1-3.
Huawei et al. Discussion on split SRB in EN-DC 3GPP TSG-RAN WG2 NR Ad hoc 1801, R2-1800722 Jan. 26, 2018 (Jan. 26, 2018) sections 1-3.

* cited by examiner

REPORTING MASTER NODE RADIO LINK FAILURE

CROSS-REFERENCE TO RELATED APPLICATION(S)

The present application claims the benefit of and priority to a provisional U.S. Patent Application Ser. No. 62/718,520, filed on Aug. 14, 2018, entitled "Supporting Fast Recovery of MCG Link." The disclosure of the application is hereby incorporated fully by reference into the present application.

FIELD

The present disclosure generally relates to wireless communications, and more particularly, to reporting a master node (MN) radio link failure in the next generation wireless networks.

BACKGROUND

In New Radio (NR), based on a received Radio Resource Control (RRC) (re)configuration, a User Equipment (UE) may send a failure report to a Master Node (MN), or a Master Cell Group (MCG), in order to inform the network (e.g., Evolved Universal Terrestrial Radio Access Network (EUTRAN), or an NR MN) of a Secondary Node (SN) (or SCG) failure. The SN failure may include, but is not limited to, an SCG radio link failure, a failure of SCG reconfiguration with sync, an SCG configuration failure for an RRC message transmitted on Signaling Radio Bearer (SRB) type 3 (SRB3), or an SCG integrity check failure. Similar to an SN failure, in NR, a UE that operates under a Multi Radio Access Technology (RAT)-Dual Connectivity (MR-DC) mode may also be capable of reporting an MN or a Master Cell Group (MCG) failure to the network. There is a need in the industry for an improved and efficient method of reporting an MN radio link failure.

SUMMARY

The present disclosure is directed to reporting a MN radio link failure in the next generation wireless networks.

In a first aspect of the present application, a method for a UE for reporting an MN failure is provided. The method comprises detecting, at the UE, a failure in a radio link to the MN; determining whether the UE is configured with a split signaling radio bearer (SRB); transmitting an MN failure report to the MN using a secondary node (SN) path of the split SRB after determining that the UE is configured with the split SRB; maintaining current measurement configurations received from the MN and the SN; and continuing to perform measurements based on the configurations received from the MN and the SN after determining that the radio link to the MN has failed.

An implementation of the first aspect, further comprises suspending MN transmission for all of SRBs and data radio bearers (DRBs), and resetting a medium access control (MAC) entity associated with the MN after determining that the radio link to the MN has failed.

In another implementation of the first aspect, the determining that the radio link to the MN has failed comprises at least one of determining that a timer for detecting a physical layer problem has expired, detecting a random access problem, and determining that a maximum number of retransmissions of MN radio link control (RLC) has been reached.

Another implementation of the first aspect further comprises forgoing reestablishing a radio resource control (RRC) connection with the MN after determining that the radio link to the MN has failed.

Another implementation of the first aspect further comprises detecting, at the UE, that in addition to the radio link failure with the MN, a radio link to the SN has also failed; and reestablishing an RRC connection with the MN.

In another implementation of the first aspect, the MN failure report comprises at least a failure cause and available measurement results.

Another implementation of the first aspect further comprises initiating (or starting) a timer upon transmission of the MN failure report; determining that the timer has expired before receiving a feedback from the MN; and reestablishing an RRC connection with the MN.

Another implementation of the first aspect further comprises determining that the UE is configured with an SRB type 3 (SRB3) after determining that the UE is not configured with the split SRB; and transmitting the MN failure report to the MN using the SRB3.

Another implementation of the first aspect further comprises, before determining that the radio link to the MN has failed, transmitting a capability message to the MN, the capability message for informing the MN that the UE supports the transmitting of the MN failure report.

Another implementation of the first aspect further comprises, before the transmitting of the MN failure report, receiving reporting configuration from the MN, wherein the transmitting of the MN failure report comprises transmitting the MN failure report based on the received reporting configuration.

In a second aspect of the present application, a UE including one or more non-transitory computer-readable media having computer-executable instructions for reporting a master node (MN) failure is provided. The UE also includes at least one processor coupled to the one or more non-transitory computer-readable media, and configured to execute the computer-executable instructions to detect, at the UE, a failure in a radio link to the MN; determine whether the UE is configured with a split signaling radio bearer (SRB); transmit an MN failure report to the MN using a secondary node (SN) path of the split SRB after determining that the UE is configured with the split SRB; maintain current measurement configurations received from the MN and the SN; and continue to perform measurements based on the configurations received from the MN and the SN after determining that the radio link to the MN has failed.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
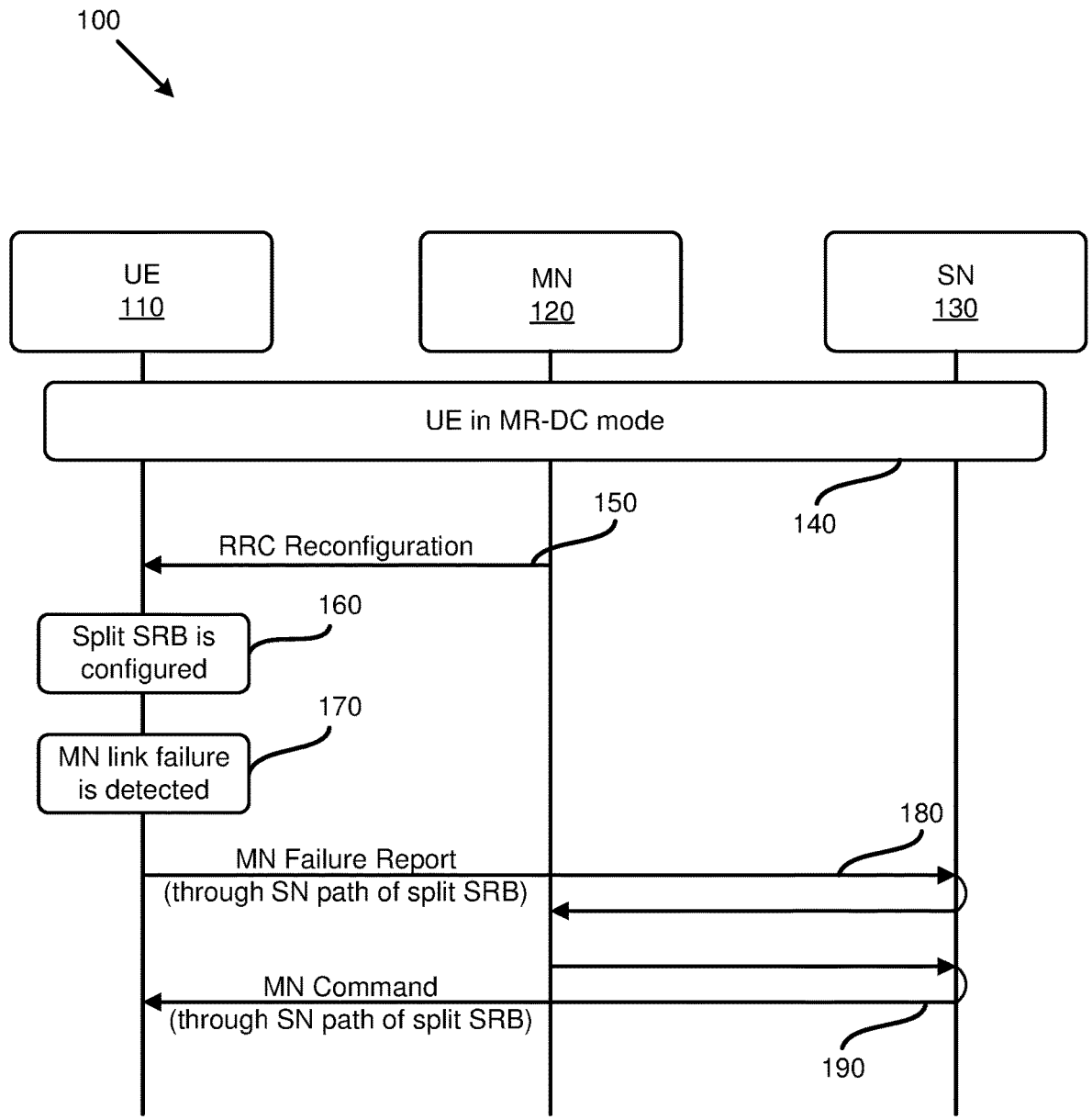
FIG. 1 is a diagram illustrating reporting an MN failure to the network when an MN (or MCG) link fails, according to one example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaptation may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

As discussed above, the next-generation (e.g., 5G NR) wireless network is envisioned to support more capacity, data, and services. A UE configured with multi-connectivity may connect to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG is a set of one or more serving cells including the PCell and zero or more secondary cells. Conversely, the SCG is a set of one or more serving cells including the PSCell and zero or more secondary cells.

As also described above, the Primary Cell (PCell) may be an MCG cell that operates on the primary frequency, in which the UE either performs the initial connection establishment procedure or initiates the connection reestablishment procedure. In the MR-DC mode, the PCell may belong to the MN. The Primary SCG Cell (PSCell) may be an SCG cell in which the UE performs random access (e.g., when performing the reconfiguration with a sync procedure). In MR-DC, the PSCell may belong to the SN. A Special Cell (SpCell) may be referred to a PCell of the MCG, or a PSCell of the SCG, depending on whether the Medium Access Control (MAC) entity is associated with the MCG or the SCG. Otherwise the term Special Cell may refer to the PCell. A Special Cell may support a Physical Uplink Control Channel (PUCCH) transmission and contention-based Random Access, and may always be activated.

When there is an SN (or SCG) radio link failure, a UE may report the failure to the MN to initiate an SN link failure recovery. Similar to reporting the SN failure, in NR, a UE may also be capable of reporting an MN radio link failure. For example, in order to avoid performing a Radio Resource Control (RRC) reestablishment procedure, the UE may use an SCG link (e.g., an SN leg of a split signaling radio bearer (SRB) configured to the UE, or an SRB3 link) to report the MN failure. In DC, a bearer which is transmitted and received via both the master and secondary base stations may be called a split bearer. The split SRB, in MR-DC, is an SRB between the MN and the UE with Radio link control (RLC) bearers configured both in the MCG and SCG.

In MR-DC (e.g., in EN-DC (E-UTRA-NR Dual Connectivity), NGEN-DC (NG-RAN E-UTRA-NR Dual Connectivity, etc.) a UE may be configured to establish an SRB (e.g., SRB3) with the SN directly, for example, to enable the RRC Protocol Data Units (PDUs) to be sent directly between the UE and the SN (e.g., for reducing the signaling latency). An SRB3 link may also be used for measurement configuration and reporting, to (re)configure the MAC, RLC, physical layer and RLF timers and constants of the SCG configuration, and to reconfigure the Packet Data Convergence Protocol (PDCP) for Data Radio Bearers (DRBs) associated with the secondary node key (S-KgNB) or SRB3, provided that the (re)configuration does not require any master node key (MeNB) involvement.

The other two forms of split SRBs, described herewith, are SRB1S, which may refer to the SCG part (may also be referred to as SN path, or SN leg) of the (MCG) split SRB1 for MR-DC (e.g., NR-NR DC), and SRB2S, with may refer to the SCG part (SN path, SN leg) of the (MCG) split SRB2 for MR-DC (e.g., NR-NR DC).

In some of the present implementations, when a UE that is in an MR-DC mode (e.g., an NR-NR DC mode, an EN-DC mode, etc.) loses the link to the MCG (e.g., when an MN radio link failure is detected), the UE may not need to perform an RRC reestablishment procedure. Instead, in some of the present implementation, the UE may send an MCG failure report (may also be referred to as an MN failure report hereinafter) to the network (e.g., to the MN and/or SN). In some aspects of the present implementations, after an MCG link fails, the UE may not perform an RRC reestablishment procedure when a split SRB1 is configured. In some other aspects of the present implementations, a UE may not perform the RRC reestablishment procedure if the SRB3 is configured for the UE.

In some of the present implementations, if an MCG failure report is allowed to be sent to the network via SRB1, the UE may transmit the MCG failure report via the SRB1S (e.g., when the split SRB1 is configured). In some of such implementations, if the split SRB1 is not configured, the UE may perform an RRC reestablishment procedure when the UE detects an MCG link failure. In some of the present implementations, the split SRB1 may be configured with a duplication function (as described below) for reporting an MN failure.

In some aspects of the present implementations, if an MCG failure report is only allowed to be sent via the SRB2, the UE may only transmit the MCG failure report via the SRB2S (if the split SRB2 is configured). In these implementations, if the split SRB2 is not configured, the UE may perform the RRC reestablishment procedure upon detection of the MCG link failure. In some other implementations, an MCG failure report may be allowed to be sent via both SRB1S and SRB2S. In some of such implementations, if both split SRB1 and split SRB2 are configured, the UE may send the MCG failure report via the SRB1S or the SRB2S, based on the UE's implementation. In one aspect of the present implementations, when both split SRB1 and split SRB2 are configured, the UE may send the MCG failure report via the SRB1S (and not the SRB2S).

In some of the present implementations, in all MCG link failed cases (e.g., all kinds of failure causes), the UE may maintain the current measurement configurations from both the MN and the SN, and the UE may continue measurements based on the configuration received from the MN and the SN (unless an exceptional scenario exists). In some of the present implementations, in all MCG link failed cases (e.g., all kinds of failure causes), the UE may suspend the MCG transmissions (or MN transmissions) for all the SRBs and DRBs. In some of the present implementations, in all MCG link failed cases (e.g., all kinds of failure causes), the UE may reset the MAC entity that is associated with the MCG.

FIG. 1 is a diagram 100 illustrating reporting an MN failure to the network when an MN (or MCG) radio link (hereinafter "link") fails, according to one example implementation of the present application. FIG. 1 includes a UE 110, an MN 120, and an SN 130. In action 140, the UE 110 is in an MR-DC mode (e.g., an NR-NR DC mode), and in communication with the MN 120 and the SN 130. Action 150 shows that the RRC reconfiguration the UE 110 receives from the MN 120 may include a configuration for a split SRB for the UE. Action 160 shows that the UE is configured with the split SRB. In action 170, the UE 110 may determine that a link to the MN (or an MCG link) has failed. Some of the failure causes for an MN radio link failure may include a timer T310 expiry, a random access problem, when maximum number of retransmissions of the RLC has been reached, an integrity failure, a reconfiguration failure, etc.

After detecting the MN link failure, the UE 110 may send, in action 180, an MCG failure report via, for example, the SN (or SCG) leg (or path) of the split SRB to the MN 120. As shown in action 180, the MN 120 may receive the MN failure report through the SN 130. In some of the present implementations, the MCG failure report may contain a failure cause and/or the (latest) available measurement results (as will be discussed in more detail below). The (latest) available measurement results may be those measured based on the measurement configurations received from the MN 120 and/or the SN 130.

In some of the present implementation, a base station (e.g., an eNB or a gNB) may configure the UE for sending the MN (MCG) failure report when a split SRB and/or SRB3 is configured to the UE. In some of such implementations, the UE may transmit the MN failure report to the NW based on the failure report configuration the UE has previously received from the base station.

After receiving the MCG failure report from the UE 110 (through the SN 130), the MN 120 may make a decision (e.g., based on the content of the failure report) and transmit, in action 190, a corresponding MN command back to the UE 110 (e.g., through the SN 130). For example, the MN 120 may transmit instructions to the UE 110 to perform a reestablishment procedure, perform a role exchange procedure, perform a handover procedure, or perform some other actions (e.g., MCG reconfiguration with sync). As will be discussed in more detail below, the handover procedure may be an Inter-Master Node handover procedure with/without a secondary node change, or a master node to eNB/gNB change procedure. In order to perform the role exchange procedure, the MN 120 may need to request the SN 130's permission first in some of the present implementations.

Figure 2:
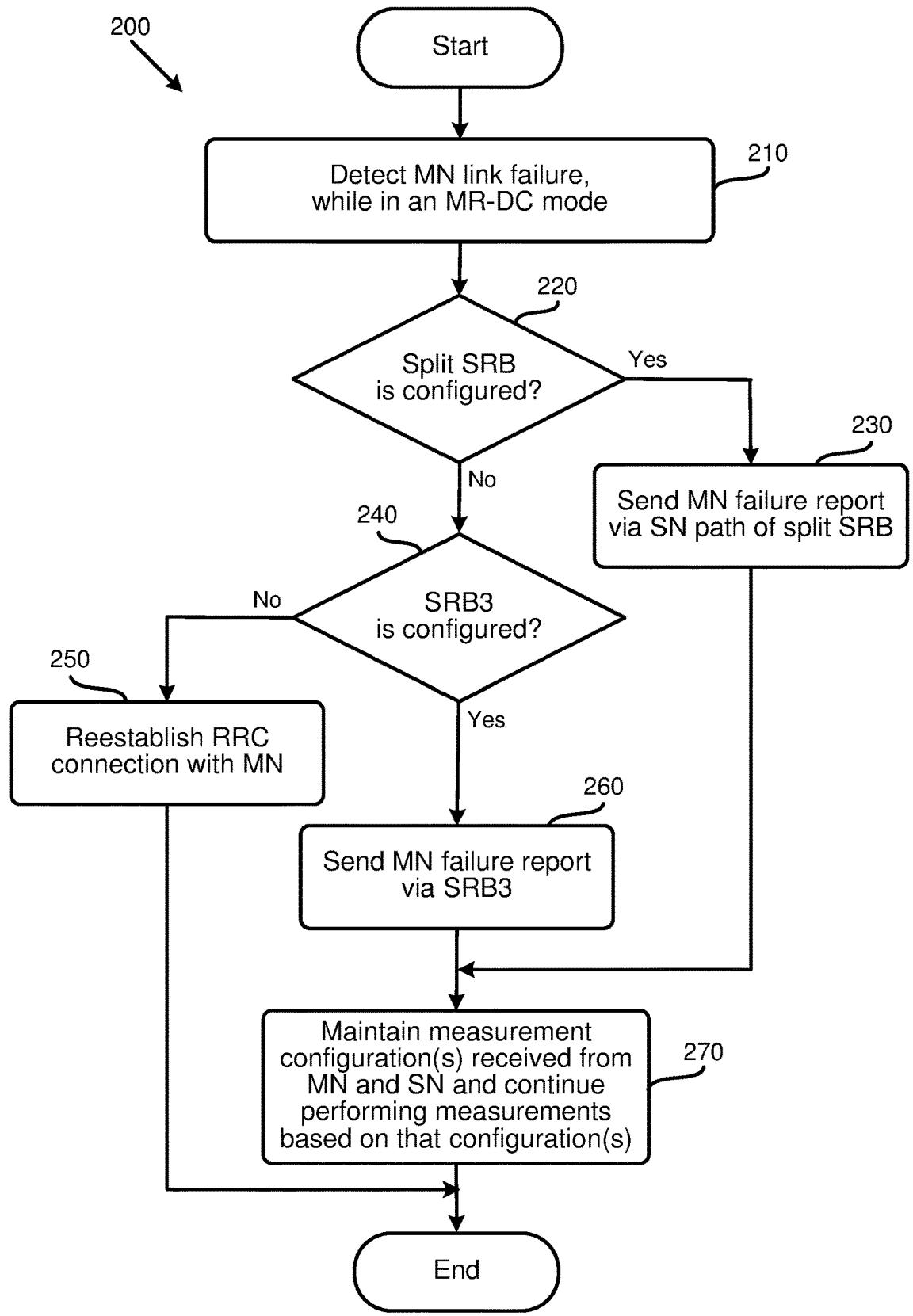
FIG. 2 is a flowchart illustrating a method (or process) performed by a UE to transmit an MN failure report to the network, according to an example implementation of the present application.

FIG. 2 is a flowchart illustrating a method (or process) 200 performed by a UE to transmit an MN failure report to the network, according to an example implementation of the present application. The process 200 may start at action 210 by detecting an MN link failure, while the UE is in an MR-DC mode. In some of the present implementations, a base station (e.g., an eNB, or a gNB) may explicitly indicate to the UE (e.g., configure the UE) to forgo performing the RRC reestablishment procedure when an MN (or MCG) link fails, and instead, report the MCG failure using an SN path of a split SRB (if the split SRB is configured), or an SRB3 link (if the SRB3 is configured). In some other aspects of the present implementations, the UE may implicitly determine whether to forgo performing the RRC reestablishment procedure (when the MCG link fails), for example, based on a set of predefined rules, or based on the received configurations (e.g., when a split SRB is configured and/or when a SRB3 is configured).

In action 220, the process 200 may determine whether a split SRB is configured for the UE. If the split SRB is configured for the UE, the process 200 may send, in action 230, an MN failure report to the network (e.g., to the MN through the SN), for example, via the SCG leg (or path) of the split SRB (e.g., the split SRB1 or split SRB2). For example, the process 200 may send the MN (or MCG) failure report via an SCG leg (e.g., SRB1S or SRB2S) of the split SRB (e.g., split SRB1 or split SRB2) based on a set of predefined rules. That is, a set of predefined/preconfigured rules may specify that the UE may send an MCG failure report via the SCG leg (e.g., SRB1S or SRB2S) of a split SRB (e.g., split SRB1 or split SRB2) if the split SRB (e.g., split SRB1 or split SRB2) is configured for the UE.

As described above, in some of the present implementations, a split SRB may be configured to the UE with a duplication function (e.g., for reporting an MN failure). In some of such implementations, when the duplication function is activated, and there is a PDCP data PDU, the PDCP entity of the UE may duplicate the PDCP data PDU and submit the duplicated PDCP data PDUs to both of the associated RLC entities (e.g., to one RLC entity associated with the MCG link and the other RLC entity associated with the SCG link). Thereafter, for an uplink data transmission, one duplicate PDCP data PDU may be transmitted on the MCG link and the other duplicate PDCP data PDU may be transmitted on the SCG link. After sending the MN failure report (in action 230), the process 200 may perform action 270, which is described below.

If the process 200 determines (in action 220) that no split SRB is configured for the UE, the process 200 may determine, in action 240, whether the SRB3 is configured for the UE or not. In some of the present implementations, the SN may inform the MN whether an SRB3 is configured for the UE. For example, the SN may inform the MN whether the SRB3 is configured for a UE during an SN addition, or SN modification procedure. If the process 200 determines that the SRB3 is configured, the process 200 may send, in action 260, the MN failure report to the MN (e.g., through the SN) using the SRB3 link to the SN. The process 200 may then perform action 270 which is described below.

In some of the present implementations, an MCG failure report sent via the SRB3 may be encoded in a format known by the MN and the SN may transparently deliver a received MCG failure report to the MN via an interface between the two nodes (e.g., X2 interface or Xn interface). Conversely, in some of the present implementations, the MCG failure report sent via the SRB3 may be encoded in the format (or ANS.1 coding) known by the SN. In some of such implementations, the SN may determine whether to deliver the related information (in the received MCG failure report) to the MN for reference. In some of the present implementations, the SN may decide on how to handle a received MCG failure report, and which action(s) to take after receiving the report. For example, in some aspects of the present implementations, the SN may decide to perform a role exchange procedure based on the received MCG failure report, while in some other aspects of present implementations, the SN may decide to indicate to the UE to perform an RRC reestablishment procedure based on the received MCG failure report.

In some of the present implementations, the NW (e.g., the MN or SN) may configure the UE to indicate which SRB should be used (or has a higher priority) if both the split SRB and SRB3 are configured. For example, if the MN configures the UE such that the split SRB has a higher priority than the SRB3, the UE may use the split SRB to send an MCG failure report when both the split SRB and SRB3 are configured to the UE.

When the process 200 determines that the UE is not configured with the SRB3 (in action 240), nor is the UE configured with the split SRB (in action 220), the process 200 of some of the present implementations may perform, in action 250, a reestablishment procedure to reestablish a link (e.g., an RRC connection) with the MN. The process may then end.

As described above, if the process 200 sends the MN failure report to the network (e.g., to the MN through the SN), either through an SN path of the split SRB (in action 230), or through the SRB3 (in action 260), the process may perform action 270 and then end. In action 270, the process 200 may maintain the current measurement configurations that the UE has received from the MN (and the SN), and continue performing the measurements based on those measurement configurations. In other words, the latest available measurement results (e.g., available measurement results of the MCG and available measurement results of the SCG) may be the results measured based on the measurement configuration received from the MN and/or the SN. In some aspects of the present implementations, the process 200 may perform other procedures instead of, or in addition to, the procedure described in action 270. For example, in some of the present implementations, the process 200 may suspend the MCG transmissions for all of the SRBs and DRBs, reset the MCG-MAC, maintain the current measurement configurations (received from the MN and/or SN), and continue performing measurement procedure(s) based on the received configurations in action 270.

In some of the present implementations, the latest available measurement results may include cell-level (e.g., calculated based on the qualified Synchronization Signal Block (SSBs) and/or Channel State Information Reference Signals (CSI-RSs)) or beam-level (e.g., reporting the best SSBs and/or the best CSI-RSs based on the signal strength) information. The quantity of a measurement result may be Reference Signal Received Power (RSRP), Reference Signal Received Quality (RSRQ), or Signal to Interference and Noise Ratio (SINR).

In some of the present implementations, the qualified SSB and/or CSI-RS may be defined based on a set of predefined rules, or based on the received configurations (e.g., the threshold that a qualified SSB or CSI-RS need to satisfy and the number of qualified SSBs or CSI-RSs used to calculate a cell-level measurement result). Similarly, the quantity of a measurement result may be indicated based on predefined rules or based on the received configurations. In some of the present implementations, the number of best SSBs (or the best CSI-RSs) that should be reported may be defined based on the received configurations or based on other information (e.g., the size of the UL resources granted for sending a failure report, for example, to include as many SSBs or CSI-RSs as possible in the order of signal strength).

In some of the present implementations, the measurement results may be encoded in a format (or ASN.1 coding) that is known by the MN. In some other implementations, the measurement results may be encoded in the format (or ASN.1 coding) that is known by the destination. For example, if an MCG failure report is sent via the SCG leg (e.g., SRB1S or SRB2S) of a split SRB (e.g., split SRB1 or split SRB2), the included measurement results may be encoded in the format (or ASN.1 coding) known by MN. On the other hand, if the MCG failure report is sent via the SRB3, the included measurement results may be encoded in the format (or ASN.1 coding) known by the SN.

In some of the present implementations, if an MCG (or MN) link fails, the UE may continue to perform the measurements based on the measurement configurations(s) already received from the MN (and the SN) and report the measurement results, for example, via the SCG leg (e.g., SRB1S or SRB2S) of the split SRB (e.g., split SRB1 or split SRB2) without any interruption in performing the measurement procedures.

As described above, in some of the present implementations, if the MCG link fails, the UE may not perform the RRC reestablishment procedure, and instead, may send an MCG (or MN) failure report via the SCG leg (or path) of a split SRB (e.g., the split SRB1 or split SRB2), or via the SRB3 (e.g., based on the UE's received configurations, the UE's autonomous selection, or a set of predefined rules). For example, if both the split SRB(s) and SRB3 are configured for a UE, the UE may choose to send the MCG failure report via the SCG leg (e.g., SRB1S or SRB2S) of the split SRB (e.g., split SRB1 or split SRB2), or may send the MCG failure report via the SRB3, or both. Similarly, the predefined rules may specify that the UE send the MCG failure report via the SCG leg (e.g., SRB1S or SRB2S) of a split SRB (e.g., split SRB1 or split SRB2) if the split SRB (e.g., split SRB1 or split SRB2) is configured for the UE. Otherwise, the UE may send the MCG failure report via the SRB3, if the SRB3 is configured for the UE. If none of the split SRB (e.g., split SRB1 or split SRB2) and SRB3 is configured for the UE, the UE may perform an RRC reestablishment procedure for the MCG link recovery.

In some of the present implementations, the UE may have informed the network (NW) of the UE's capability beforehand (e.g., whether the UE supports transmitting of the MN failure report). For example, the UE may inform the NW (e.g., an MN or an SN) whether the UE supports sending an MCG failure report via a split SRB or not. In some of such implementations, the UE may report its capability when the MN requests it (e.g., through the SRB1 or SRB2) and/or the UE may report the capability when the SN requests the UE's capability (e.g., via the SRB3). In some of the present implementations, the UE's capability may be different for the Time Division Duplex (TDD) and the Frequency Division Duplex (FDD). For example, the capability report may indicate whether a UE supports sending the MCG failure report via the split SRB in the TDD mode, and/or whether the UE supports sending the MCG failure report via the split SRB in the FDD mode. In some of the present implementations, the UE's capability may be different for Frequency Range 1 (FR1) and Frequency Range 2 (FR2). For example, the capability report may indicate whether the UE supports sending the MCG failure report via the split SRB in FR1 and/or FR2. It should be noted that FR1 may be defined from 450 MHz to 6000 MHz and FR2 may be defined from 24250 MHz to 52600 MHz.

In some of the present implementations, the MN may inform the SN whether a UE supports sending the MCG failure report (e.g., via a split SRB). Conversely, in some other aspects of the present implementations, the SN may inform the MN whether the UE supports the transmission of the MCG failure report (e.g., via a split SRB).

In some of the present implementations, instead of, or in addition to, sending a capability report for the split SRB, a UE may inform the NW whether the UE is capable of sending an MCG failure report via the SRB3. For example, the UE may report its capability when an MN requests it via the SRB1 or SRB2, and/or when the SN requests the UE's capability via the SRB3. In some of the present implementations, the UE's capability may be different for the TDD and FDD (i.e., the capability report may indicate whether the UE supports sending the MCG failure report via the SRB3 in the TDD mode and/or the FDD mode). Similarly, the UE's capability may be different for FR1 and FR2 (i.e., the capability report may indicate whether the UE supports sending the MCG failure report via the SRB3 in FR1 and/or FR2). In some of the present implementations, the MN may inform the SN whether a UE supports sending the MCG failure report via the SRB3, while in some other implementations, the SN may inform the MN of such. In some of the present implementations, the MN may first send a request to the SN asking whether the SN supports receiving the MCG failure report via the SRB3. In some of such implementations, the SN may respond to the MN whether the SN supports receiving the MCG failure report (e.g., via the SRB3) or not (e.g., the SN may accept or reject MN's request for supporting the MCG failure report, e.g., via the SRB3). In some aspects of the present implementations, the UE may inform the NW (e.g., the MN and/or the SN) whether the UE supports sending an MCG failure report via both the split SRB and the SRB3.

In some of the present implementations, the MCG failure report may contain a failure cause and/or the latest available measurement results. In some aspects of the present implementations, the UE may send the MCG failure report only when the link associated with the PCell fails (or has a problem). In some of such implementations, a link failure (or problem) related to other cells in the MCG (except the PCell) may not trigger an MCG failure report. In some other aspects of the present implementations, an MCG failure report may be sent to the NW due to a link failure (or problem) of any of the cells in the MCG. In some of the present implementations, the MCG failure report may include the cell ID to inform the NW which cell's link has failed. In some of the present implementations, the MCG failure report may include an indicator to indicate whether the failed link is related to the PCell or not. In some of the present implementations, the MCG failure report may include other information, such as which RLC bearer, or logical channels, has failed (or has problems).

In some of the present implementations, an SCG failure report may be triggered when a link of any cell in the SCG fails (of has problem). The SCG failure report, in some of the present implementations, may include the cell ID (to inform the NW which cell's link has failed), a PSCell indicator (to indicate whether the failed link is related to PSCell or not), the information of which RLC bearer or logical channel has failed (or has problems), etc.

The failure cause in the failure report, in some of the present implementations, may also include the timer T310 expiry, Random Access problem, whether the maximum number of retransmissions of the MCG RLC has been reached, Integrity failure, MCG reconfiguration failure, etc. In some of the present implementations, the failure cause of the timer T310 expiry may be detected on an SpCell only, (e.g., when the T310, N310, and N311 are only configured in the SpCell related configurations). In some of the present implementations, upon the timer T310 expires in the PCell, the UE may determine that a radio link failure is detected for the MCG. The UE may then send an MCG failure report (e.g., to the MN).

Additionally, in some of the present implementations, upon the T310 expires in the PSCell, the UE may determine that a radio link failure is be detected for the SCG and send an SCG failure report to the NW. In some of the present implementations, the T310 may start upon detecting a physical layer problem in the SpCell (e.g., upon receiving N310 consecutive out-of-sync indications from the lower layers). The decision on when to start (and/or stop) the timer T310 may be predefined/preconfigured for the UE in some of the present implementations. For example, the timer T310 may stop upon receiving the N311 consecutive in-sync indications (e.g., from the lower layers) for the SpCell, upon receiving an RRC Reconfiguration message (e.g., with reconfigurationWithSync, or a synchronous reconfiguration to a target cell) for the corresponding cell group, and upon initiating the connection reestablishment procedure, or upon the SCG release (if the T310 is kept in the SCG).

In some of the present implementation, if the T310 is kept in the MCG and security is not activated, the UE may transition to an RRC Idle state. On the other hand, in some of such implementations, if the T310 is kept in the MCG and security is activated, the UE may send an MCG failure report to the NW.

In some of the present implementations, the MN or SN may configure or broadcast (e.g., in the system information) another timer T310-$x$ (which may be shorter than the timer T310) and/or a new constant N310-$x$ and new constant N311-$x$. In some of the present implementations, upon sending an MCG failure report, the UE may apply the timer T310-$x$, and not timer T310. That is, upon sending the MCG failure report, the timer T310-$x$ may start after detecting the physical layer problem(s) for the PSCell (e.g., upon receiving N310-$x$ consecutive out-of-sync indications from the lower layers). The timer T310-*x* may stop upon receiving N311-*x* consecutive in-sync indications from the lower layers for the PSCell, after receiving RRCReconfiguration with reconfigurationWithSync for that cell group, and initiating the connection reestablishment procedure. The timer T310-*x* may stop upon the SCG release, if the T310-*x* is kept in the SCG. When T310-*x* expires, the UE may perform a reestablishment procedure.

In some of the present implementations, when the MCG link is resumed, the UE may apply the T310, N310, and N311 again. In some of the present implementations, the values of the T310 and T310-*x* may be the same. Similarly, the values of the N310 and N310-*x*, and/or the value of the N311 and N311-X, may be the same in some of the present implementations. In some of the present implementations, the SN may configure (or broadcast in the system information) a scaling factor for the T310 and/or a scaling factor for the N310 (and a scaling factor for the N311). That is, upon sending the MCG failure report, a UE may apply a scaling factor (if configured) to the value of the timer T310, or a scaling factor (if configured) to the value of the N310, or a scaling factor (if configured) to the value of the N311. In some of such implementations, upon sending the MCG failure report, the scaled T310 may start upon detecting a physical layer problem(s) for the PSCell (e.g., after receiving scaled N310 consecutive out-of-sync indications from the lower layers).

The scaled T310 may stop after receiving scaled N311 consecutive in-sync indications from the lower layers for the PSCell, after receiving RRCReconfiguration with reconfigurationWithSync for the corresponding cell group, and upon initiating the connection reestablishment procedure. The scaled T310 may also stop upon the SCG release, if the scaled T310 is kept in the SCG. When the scaled T310 expired, the UE may perform a reestablishment procedure.

In some of the present implementations, when the MCG link is resumed, the UE may apply the T310, N310, and N311 again. In some of the present implementations, if a scaling factor for T310 is not configured, a UE may still apply the normal T310. Similarly, if a scaling factor for the N310 is not configured, the UE may still apply the normal N310, and if a scaling factor for the N311 is not configured, the UE may still apply the normal N311. In some other implementations, the scaling factor may be variable, e.g., depending on the moving speed of the UE (e.g., different scaling factors may be applied for a normal, medium, or high speed UE). In some other implementations, the T310-*x*/N310-*x*/N311-*x* may be variables that depend on the SN's condition. For example, if the SN is a gNB, the scaling factor may be applied, otherwise (e.g., when the SN is an eNB), the same value as the T310/N310/N311 may be applied.

In some of the present implementations, a UE may send a common failure report for both the MCG failure and the SCG failure to the network. In some of such implementations, the common failure report may include a failure source indicator for indicating whether the report is for an MCG failure or an SCG failure, or both. When multiple SNs are added, the common failure report may include the failure information, as well as an indicator to indicate to which cell group (e.g., the MCG, SCG #1, or SCG #2) the failure information is related.

As discussed above, a UE, in the MR-DC mode, may be configured not to perform an RRC reestablishment procedure when an MCG link failure is detected. Instead, in some of the present implementations, the UE may transmit an MN (or MCG) failure report to the network via the SRB3 (if the SRB3 is configured). In some of such implementations, if the SRB3 is not configured to the UE, upon detection of an MCG link failure, the UE may perform an RRC reestablishment procedure.

Figure 3:
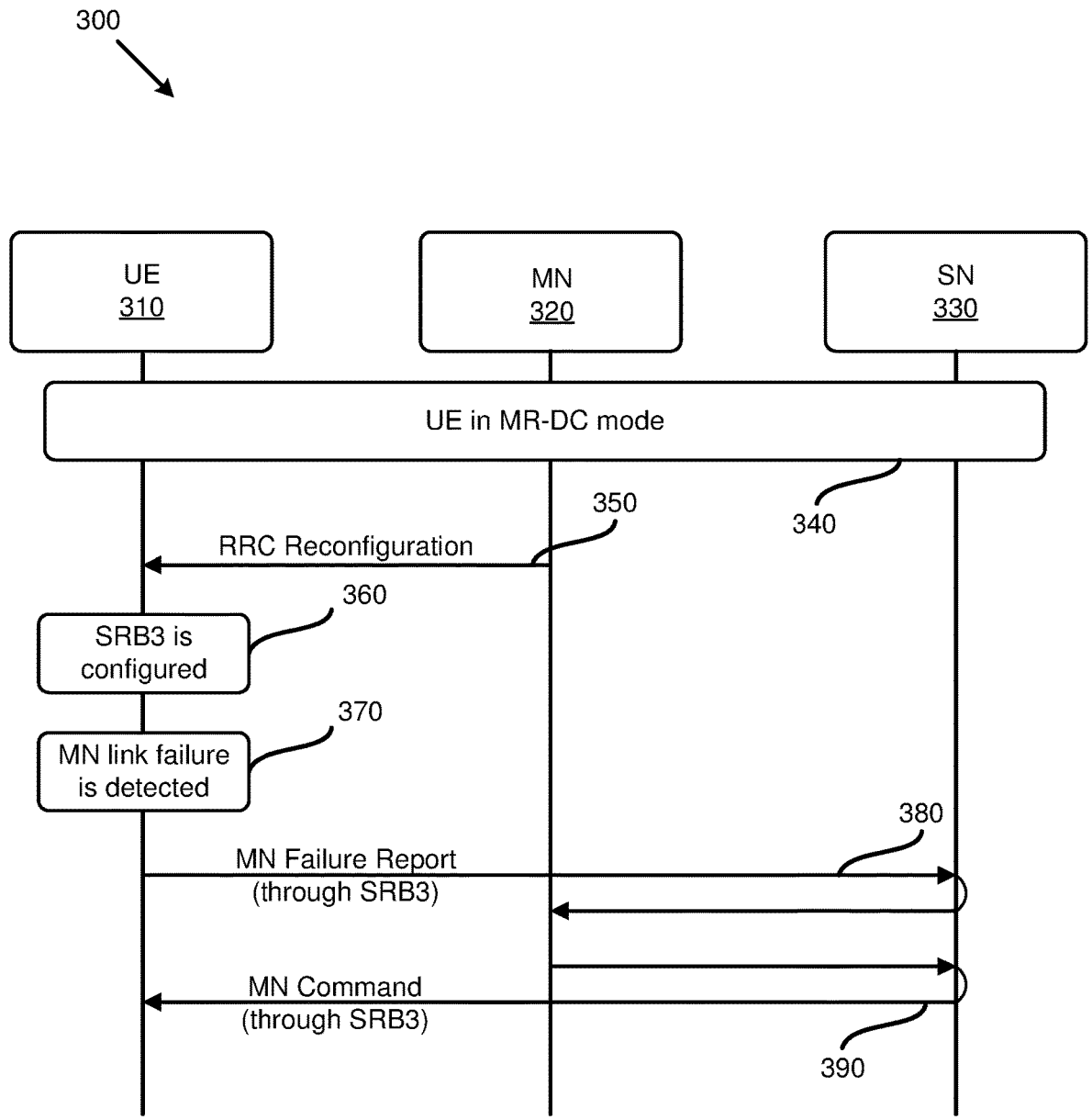
FIG. 3 is a diagram illustrating reporting an MN failure to the network when an MN (or MCG) link fails, according to one example implementation of the present application.

FIG. 3 is a diagram 300 illustrating reporting an MN failure to the network when an MN (or MCG) link fails, according to one example implementation of the present application. FIG. 3 includes a UE 310, an MN 320, and an SN 330. In action 340, the UE 310 is in an MR-DC mode (e.g., an NR-NR DC mode), and in communication with the MN 320 and the SN 330. Action 350 shows that the UE 310 receives the RRC reconfiguration from the MN 320 which may configure the UE with the SRB3. Action 360 shows that the UE 310 may be configured with the SRB3. In action 370, the UE 310 may determine that a link to the MN (or an MCG link) has failed. As a result, the UE 310 may send, in action 380, an MN failure report via, for example, the SRB3 to the MN 320. As shown in action 380, the MN 320 may receive the MN failure report through the SN 330. In some of the present implementations, the MCG failure report may contain a failure cause and/or the latest available measurement results (as will be discussed in more detail below).

After receiving the MCG failure report from the UE 310 (through the SN 330), the MN 320 may make a decision (e.g., based on the content of the failure report) and may transmit, in action 390, a corresponding MN command back to the UE 310 (e.g., through the SN 330). For example, the MN 320 may transmit instructions to the UE 310 to perform a reestablishment procedure, perform a role exchange procedure, perform a handover procedure, or perform some other actions (e.g., MCG reconfiguration with sync). As discussed above, the handover procedure may be an Inter-Master Node handover procedure with/without a secondary node change, or a master node to eNB/gNB change procedure. In order to perform the role exchange procedure, the MN 320 may need to request the SN 330's permission first in some of the present implementations. In some of the present implementations, the MN may send an MN command to the SN via the inter-node interface (e.g., the X2 interface or the Xn interface) and the SN may forward the MN command to the UE.

Figure 4:
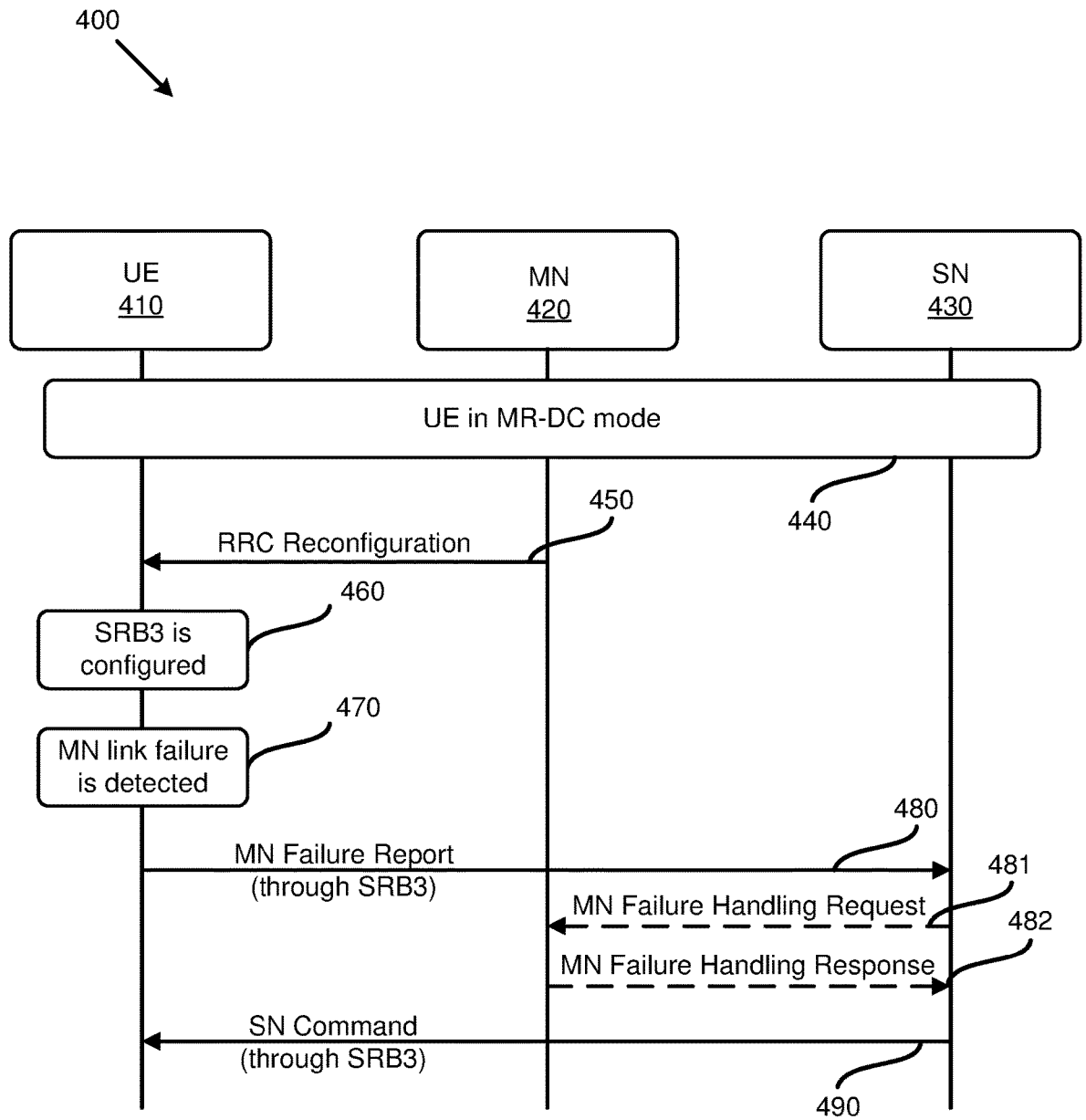
FIG. 4 is a diagram illustrating transmitting an MN failure report to the network when an MN (or MCG) link fails, according to one example implementation of the present application.

FIG. 4 is a diagram 400 illustrating reporting an MN failure to the network when an MN (or MCG) link fails, according to one example implementation of the present application. FIG. 4 includes a UE 410, an MN 420, and an SN 430. In action 440, the UE 410 is in an MR-DC mode (e.g., an NR-NR DC mode), and in communication with the MN 420 and the SN 430. The UE 410 may receive the RRC reconfiguration, in action 450, from the MN 420 to be configure with the SRB3. Action 460 shows that the UE 410 may be configured with the SRB3. In action 470, the UE 410 may determine that a link to the MN (or an MCG link) has failed. As a result, the UE 410 may send, in action 480, an MCG failure report via the SRB3 to the SN 430. The MCG failure report may contain a failure cause and/or the latest available measurement results. After receiving the MCG failure report from the UE 410, the SN 430 may make a decision (based on the content of the report) and transmit the corresponding SN command back to the UE 410, in action 490. The SN 430 may command the UE to perform a reestablishment procedure, perform a role exchange procedure, perform a handover procedure, or perform other actions (e.g., MCG reconfiguration with sync). The handover procedure may be an Inter-Master Node handover procedure with/without a secondary node change or a master node to eNB/gNB change procedure.

As shown in FIG. 4, before sending the SN command to the UE 410, the SN 430 may send, in action 481, an MN Failure Handling Request to the MN 420, and the MN may send, in action 482, an MN Failure Handling Response back to the SN 430 (e.g., to acknowledge the request, or for non-acknowledgment, or to suggest actions taken by the SN 430 to deal with the MCG failure). For example, the SN 430 may ask the MN 420 to perform a role exchange procedure. The MN 420 may accept the SN's request to trigger the role exchange procedure, or may suggest to the SN 430 to release the RRC connection. In another example, the MN 420 may suggest to the SN 430 to trigger an RRC reestablishment procedure (e.g., by sending RRC signaling to transmit the corresponding command to the UE 410).

As described above, when an MCG link fails (e.g., because of any of the failure causes), the UE may maintain the current measurement configurations received from both the MN and the SN, and continue performing the measurement procedure(s) based on the configurations received from the MN and the SN. Some of the failure causes for an MCG failure may include a timer T310 expiry, a random access problem, when the maximum number of retransmissions of the RLC has been reached, an integrity failure, a reconfiguration failure, etc. The measurements results based on the MN configurations may continue to be reported after the MCG failure. For example, if a split SRB is configured, the measurements results (prepared based on the MN configurations) may continue to be reported to the NW via the SCG leg of the split SRB. Conversely, if only the SRB3 is configured for the UE, the measurement results may continue to be reported to the NE using the SRB3. The SN may forward the received measurement report to the MN, e.g., via an inter-node interface (e.g., the X2 interface or the Xn interface).

In one aspect of the present implements, under certain conditions, a UE may not continue performing measurements based on configurations received from the MN after an MCG link failure is detected. For example, in some of the present implementations, when the UE is not able to maintain the timing for a PCell, the UE may not continue performing measurements based on configurations received from the MN after an MCG link failure is detected.

In some of the present implementations, the UE may send an MCG link resume message to indicate that the MCG link failure is resolved and the UE is reconnected to the MN. In some of the present implementations, the MCG link resume message may be sent via a split SRB (if configured), or the SRB3 (if configured). In some other aspects of the present implementations, the MCG failure report may include an additional indicator to indicate that the MCG link failure is resolved.

In some of the present implementations, upon detection of an MCG link failure, or after sending the MCG failure report, the UE may start a timer (e.g., when a timer T1 is configured, or predefined). In some of such implementations, after receiving a command from the MN (or the SN) to, for example, trigger a reestablishment procedure, or perform a role exchange procedure, or perform a handover procedure, the UE may stop the timer T1. If the timer T1 expires, however (e.g. the UE has not received any command from the NW), in some of the present implementations, the UE may perform a reestablishment procedure (if security is activated).

Figure 5:
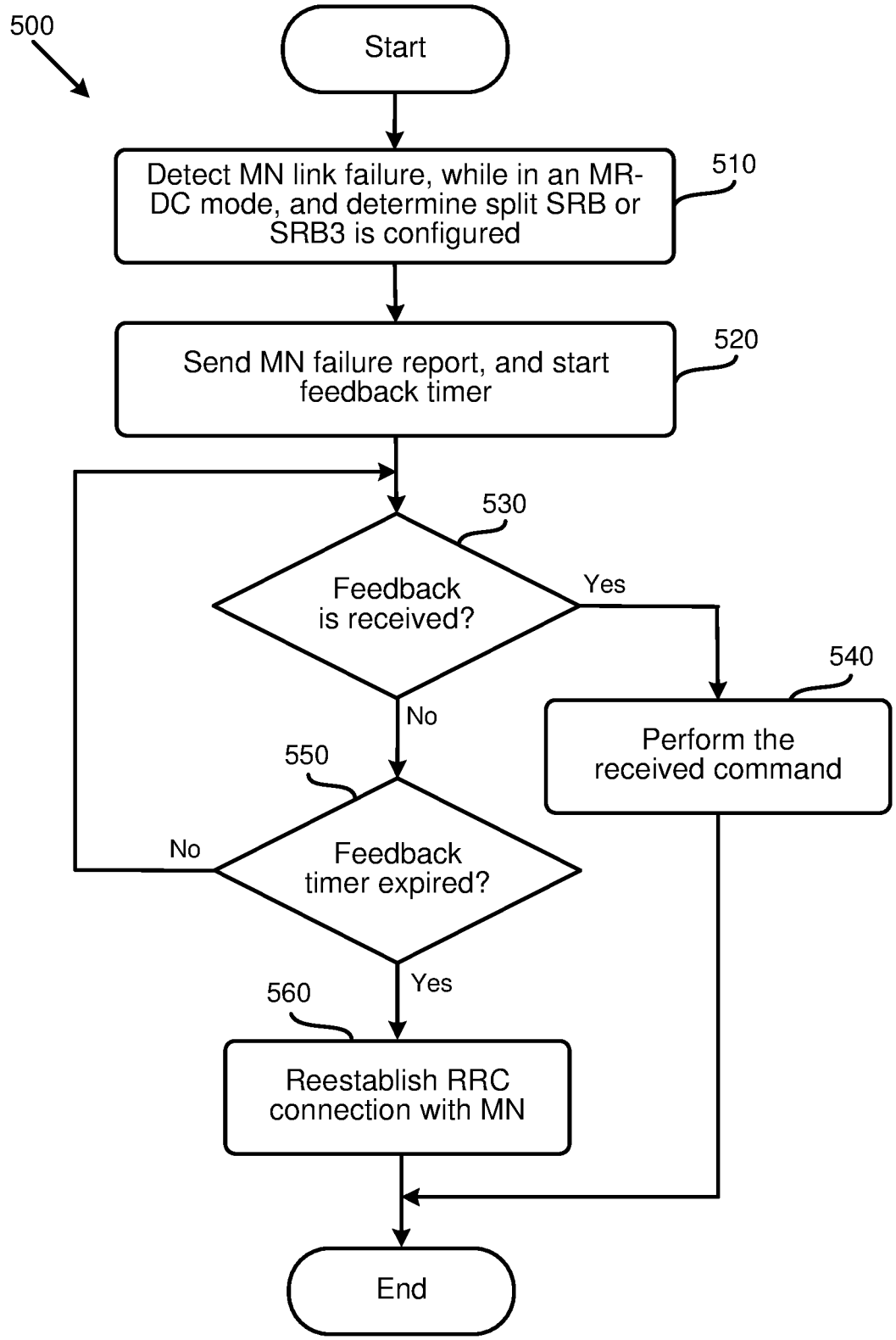
FIG. 5 is a flowchart illustrating a method (or process) performed by a UE to start a reestablishment procedure after an MN failure is reported to the network and no response is received within a certain time period, according to an example implementation of the present application.

FIG. 5 is a flowchart illustrating a method (or process) 500 performed by a UE to start a reestablishment procedure after an MN failure is reported to the network and no response is received within a certain time period, according to an example implementation of the present application. The process 500 may start at action 510 by detecting an MN link failure and determining that a split SRB and/or SRB3 is configured to the UE, while the UE is operating in an MR-DC mode.

The process 500 may send, in action 520, an MN failure report to the network after determining that the MN link has failed. In some of the present implementations, upon detecting the MCG (or MN) link failure, or after sending the MN failure report, the process 500 may also start (or restart) a feedback timer (e.g., timer T1). The value of the timer T1 may be predefined or may be assigned based on the received configurations, or may be broadcast in the system information blocks.

In action 530, the process 500 may determine whether any feedback (or command) has been received from the network (e.g., from the MN and/or the SN). In some of the present implementations, based on the received MCG failure report or measurement results (or failure information), the MN may command a UE to perform a particular procedure. For example, based on the content of the received failure report, the MN may send instructions to the UE to perform an RRC reestablishment procedure, a role exchange procedure, a handover procedure, or any other action (e.g., sync to MN). The handover procedure may be an Inter-Master Node handover procedure with/without a secondary node change, or a master node to eNB/gNB change procedure. In some of the present implementations, the command from the MN may be transmitted via the SCG leg of a configured split SRB. In some of the present implementations, for a role exchange procedure, when a UE is configured to connected to both of the source Base Station (BS) and the target BS, the PCell and the PSCell for the UE may be switched, such that the PCell may be the new PSCell, and the PSCell may be the new PCell. Thereafter, the source BS may be released.

In some of the present implementations, when performing the role exchange procedure, the UE may be reconfigured not to send a failure report related to the cell group, or to the link of the previous source BS, (e.g., the transmission of the SCG failure report may be prohibited). In some of the present implementations, the NW may command the UE to resume sending the SCG failure report. In some of the present implementations, the UE may autonomously stop sending a failure report related to the cell group, or link of the previous source BS. In some of the present implementations, a UE may send an SCG failure report again when the SCG link (connection) is resumed by the NW after performing the role exchange procedure. In some of the present implementations, a UE may send an SCG failure report based on the UE's implementation after performing the role exchange procedure. For example, a UE may send the SCG failure report based on its implementation after sending a resume message related to the previous MCG.

After receiving the command from the MN (or SN) to perform a certain action(s) (e.g., to trigger a reestablishment procedure, to perform a role exchange procedure, or to perform a handover procedure), the UE may stop the timer T1 and perform, in action 540, the received command. The process 500 may then end.

When the process 500 determines that no command has been received from the network (e.g., in action 530), the process may determine, in action 550, whether the time T1 has expired or not. If the process determines that the time has not expired yet, the process 500 may loop back to action 530 to determine whether a feedback is received (while the timer T1 is counting down). However, if the process determines, in action 550, that the feedback timer has expired, the process may perform, in action 560, a reestablishment procedure to reestablish an RRC connection with the MN.

In some of the present implementations, the process 500 may perform the reestablishment procedure after the timer T1 has expired if the security is activated, otherwise the process may take one or more actions to leave the RRC Connected state and enter an RRC Idle state. In some of the present implementations, if the SCG link fails, while the MCG link has already failed and not been recovered yet, the process may perform the reestablishment procedure. In some of the present implementations, if multiple SNs are added, the process may perform the reestablishment procedure (in action 560) only if all the MCG links and the SCG links have failed. In some of the present implementations, when the reestablishment procedure is initiated, the UE may perform cell selection to find a suitable cell of the same RAT (e.g., NR). Upon selecting an inter-RAT cell, in some of such implementations, the UE may perform one or more actions to leaving the RRC Connected state. In some of the present implementations, when the reestablishment procedure is initiated, the UE may release the MCG SCell(s) and may release the entire SCG configuration.

As described above, a UE that is in an MR-DC mode and is configured with a split SRB may send an MCG failure report to the network via an SCG leg of the split SRB after detecting an MCG link failure. Upon sending the MCG failure report (or upon detection of the MN link failure), the UE may also start a timer T1. If no MN command is received and the timer T1 expires, the UE of some of the present implementations may perform a reestablishment procedure (if security is activated).

Figure 6:
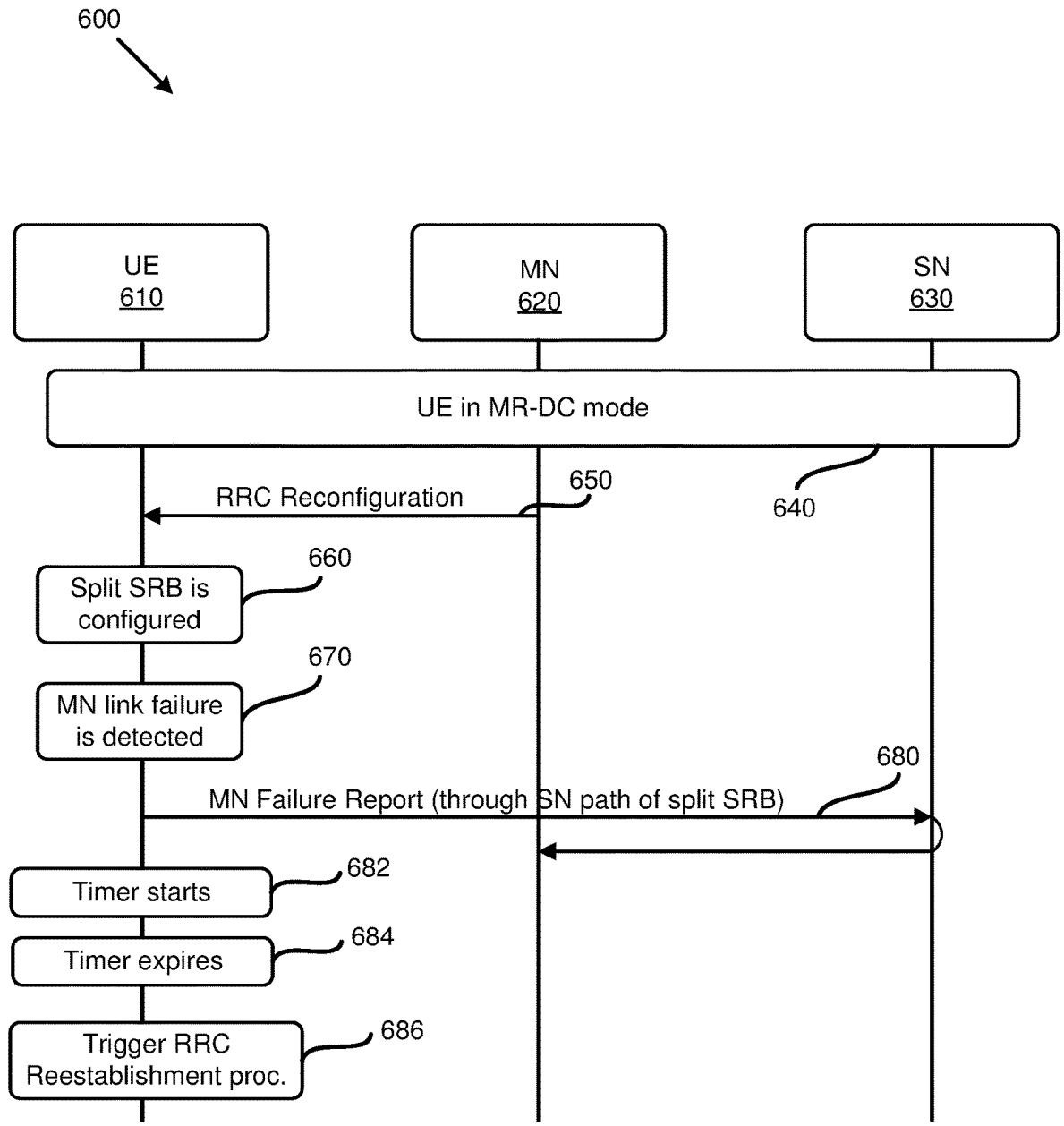
FIG. 6 is a diagram illustrating reporting an MN failure to the network when an MN link fails and starting a timer for receiving feedback from the network, according to one example implementation of the present application.

FIG. 6 is a diagram 600 illustrating reporting an MN failure to the network when an MN link fails and starting a timer for receiving feedback from the network, according to one example implementation of the present application. FIG. 6 includes a UE 610, an MN 620, and an SN 630. In action 640, the UE 610 is in an MR-DC mode (e.g., an NR-NR DC mode), and in communication with the MN 620 and the SN 630. The UE 610 may receive the RRC reconfiguration, in action 650, from the MN 620, e.g., to be configure with a split SRB. Action 660 shows that the UE 610 is configured with the split SRB. In action 670, the UE 610 may detect an MN link failure. As a result, the UE 610 may send, in action 680, an MCG failure report via an SN leg of the split SRB to the MN 620 (via the SN 630). FIG. 6 also shows that after sending the MCG failure report, the UE may start a timer T1 in action 682. As described above, in some other aspects of the present implementations, the UE may start the timer T1 before sending the MN failure report. For example, the UE 610 may start the timer T1 once the MN failure report is detected. The timer T1 may expire, in action 684, without receiving any feedback from the network. In some of the present implementations, if the timer T1 expires and no feedback is received from the network, the UE 610 may trigger an RRC reestablishment procedure, in action 686, to establish an RRC connection with the MN 620.

Figure 7:
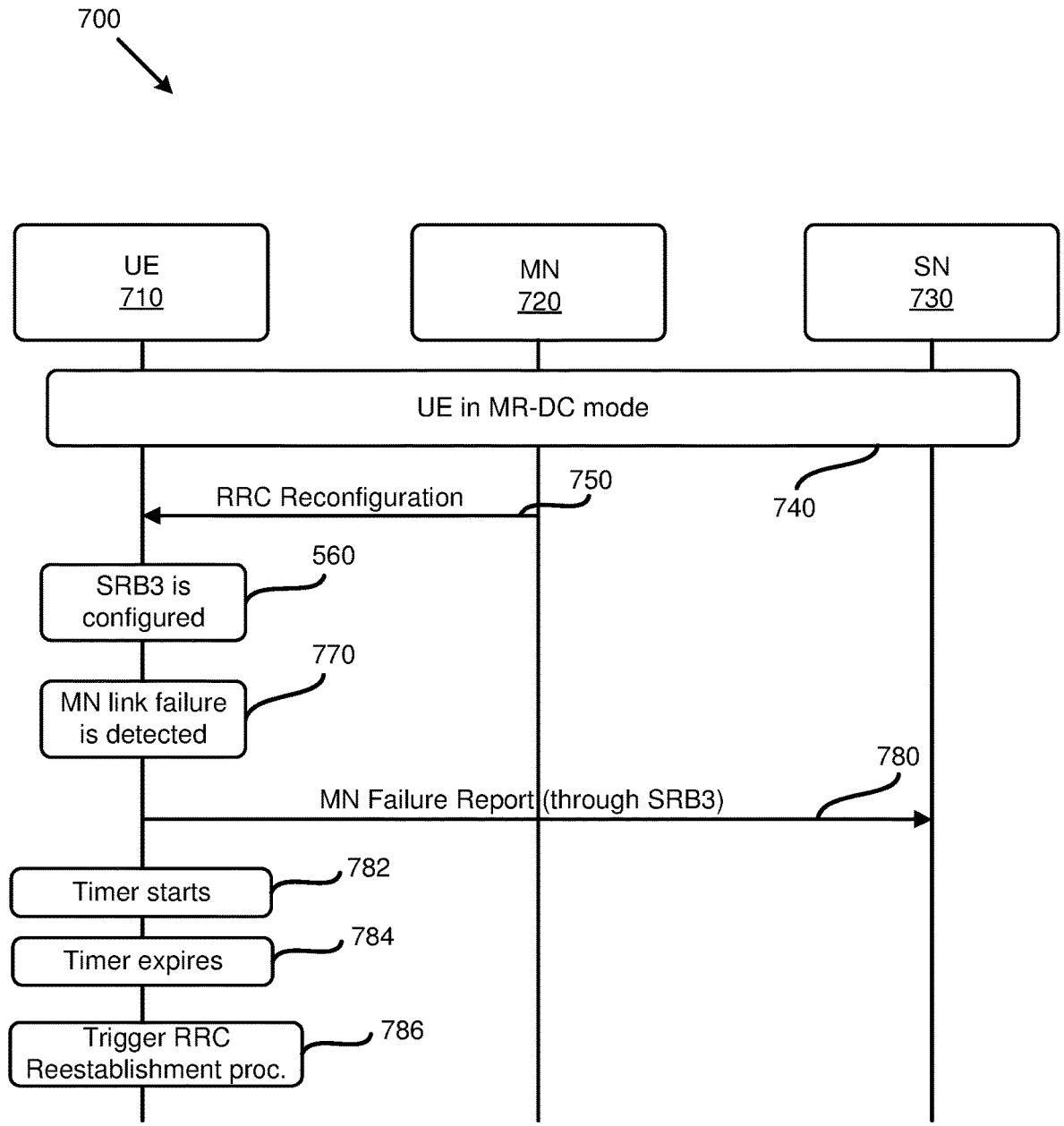
FIG. 7 is a diagram illustrating sending an MN failure report to the network when an MN link fails and starting a timer for receiving feedback from the network, according to one example implementation of the present application.

FIG. 7 is a diagram 700 illustrating reporting an MN failure to the network when an MN link fails and starting a timer for receiving feedback from the network, according to one example implementation of the present application. FIG. 7 includes a UE 710, an MN 720, and an SN 730. In action 740, the UE 710 is in an MR-DC mode (e.g., an NR-NR DC mode), and in communication with the MN 720 and the SN 730. The UE 710 may receive the RRC reconfiguration, in action 750, from the MN 720, e.g., to be configured with SRB3. Action 760 shows that the UE 710 is configured with the SRB3. In action 770, the UE 710 may detect an MN link failure. As a result, the UE 710 may send, in action 780, an MCG failure report via the SRB3 to the SN 730. FIG. 7 also shows that after sending the MCG failure report, the UE may start a timer T1 in action 782. As described above, in some other aspects of the present implementations, the UE may start the timer T1 before sending the MN failure report. For example, the UE 710 may start the timer T1 once the MN failure report is detected. The timer T1 may expire, in action 784, without receiving any feedback from the network. In some of the present implementations, if the timer T1 expires and no feedback is received from the network, the UE 710 may trigger an RRC reestablishment procedure, in action 786, to establish an RRC connection with the MN 720.

In some of the present implementations, the timer T1 for transmitting the MCG failure report via the SCG leg of a split SRB and the timer T1 for transmitting the MCG failure report via the SRB3 may be configured (or predefined) separately.

In some of the present implementations, when a UE initiates the procedure to report an MCG failure via report an SCG leg (e.g., SRB1S or SRB2S) of a split bearer or via the SRB3, a prohibit timer may start. In some of such implementations, the UE may only be allowed to send another MCG failure report when the prohibit timer expires. In some of the present implementations, when a UE initiates the procedure to report an MCG failure via the SCG leg (e.g., SRB1S or SRB2S) of a split bearer or via the SRB3, the UE may only be allowed to send another MCG failure report that has a different failure cause (than the original failure report), or that includes different measurement results. In some of the present implementations, when a UE initiates the procedure to report an MCG failure via the SCG leg (e.g., SRB1S or SRB2S) of a split bearer or via the SRB3 (or when a UE detects a failure in a radio link to the MN), the UE may suspend the MCG transmissions (or MN transmissions) for all the SRBs and DRBs. In some of such implementations, when a UE initiates the procedure to report an MCG failure via the SCG leg (e.g., SRB1S or SRB2S) of a split bearer or via the SRB3 (or when a UE detects a failure in a radio link to the MN), the UE may also reset the MAC entity that is associated with the MCG.

As described above, in some of the present implementations, a UE may send a common failure report for both the MCG failure and the SCG failure to the network. In some of such implementations, the common failure report may include a failure source indicator for indicating whether the report is for an MCG failure or an SCG failure, or both. An example implementation for a data structure for a common failure report is shown below with reference to Failure Report 1.

| Failure Report 1 | |
|---|---|
| FailureReport | SEQUENCE { |
| failureCG | ENUMERATED {MCG, SCG} |
| failureType | ENUMERATED) {t310-Expiry, randomAccessProblem, rlc-MaxNumRetx, scg-ChangeFailure, reconfigFailure, IntegrityFailure}, |
| measResult | OCTET STRING (CONTAINING MeasResult-Failure) |

The above data structure for the common failure report, as shown, may include several Information Element (IEs). The IE failureCG may be used in some of the present implementations to indicate which cell group (e.g., MCG or SCG) has failed. The IE failureType may be used to indicate the failure cause detected by the UE. The failure cause may include the timer T310 expiry (referred to as t310—Expiry above in the data structure), random access problem (referred to as randomAccessProblem), and the maximum number of retransmissions of RLC that has been reached (referred to as rlc-MaxNumRetx), Integrity Failure (referred to as IntergrityFailure), reconfiguration failure (referred to as reconfigFailure), and SCG change failure (referred to as scg-ChangeFailure).

The above Failure Report data structure may indicate that an MCG link failure is detected due to the T310 expiry if the failureCG is set to MCG and the failureType is set to t310—Expiry. If the failureCG is set to MCG and the failureType is set to randomAccessProblem, it may indicate that a random access problem indication is received from the MCG MAC. If the failureCG is set to MCG and the failureType is set to rlc-MaxNumRetx, it may indicate that the maximum number of retransmissions of MCG RLC has been reached. If the failureCG is set to MCG and the failureType is set to IntergrityFailure, it may indicate that the MCG link failure is detected due to an SRB1 IP check failure or an SRB2 IP check failure. If the failureCG is set to MCG and the failureType is set to reconfigFailure, it may indicate that the MCG link failure is detected due to Reconfiguration failure of the MN RRC reconfiguration message. It should be noted that if the failureCG is set to MCG, the failureType may not be set to the scg-ChangeFailure in some of the present implementations.

Conversely, in the above Failure Report data structure, if failureCG is set to SCG and the failureType is set to t310—Expiry, it may indicate that the SCG link failure is detected due to the T310 expiry. If the failureCG is set to SCG and the failureType is set to randomAccessProblem, it may indicate that a random access problem indication is received from the SCG MAC. If the failureCG is set to SCG and the failureType is set to rlc-MaxNumRetx, it may indicate that the maximum number of retransmissions of the SCG RLC has been reached. If the failureCG is set to SCG and the failureType is set to IntergrityFailure, it may indicate that the SCG link failure is detected due to an SRB3 IP check failure. If the failureCG is set to SCG and the failureType is set to reconfigFailure, it may indicate that the MCG link failure is detected due to a Reconfiguration failure of the SN RRC reconfiguration message. If the failureCG is set to SCG and the failureType is set to scg-ChangeFailure, it may indicate that synchronization to an SCG has failed.

In the above Failure Report data structure, the IE measResult or IE MeasureResult-Failure may be used to provide information regarding the failures detected by the UE. The information regarding the failures may include the measurement results, the associated Synchronization Signal Block (SSB) frequency, the associated reference frequency of a CSI-RS, and the associated cell information or the associated cell list. Measurement results here may be cell-level (e.g., calculated based on the qualified SSBs or calculated based on the qualified CSI-RS s) or beam-level (e.g., reporting the best SSBs or the best CSI-RS s based on signal strength). The quantity of a measurement result may be the RSRP, RSRQ or SINR. The qualified SSB or the qualified CSI-RS may be defined based on a set of predefined rules or based on the received configurations (e.g., the threshold that a qualified SSB or CSI-RS may need to be satisfied and the number of qualified SSBs or CSI-RS s used to calculate a cell-level measurement result). The quantity of a measurement result may be indicated based on the predefined rules or based on the received configurations. The number of best SSBs or the best CSI-RS s to be reported may be based on the received configurations or based on the size of the UL resources granted for sending the failure report (e.g., including as many SSBs or CSI-RS s as possible in the order of signal strength).

Another example implementation of a common Failure Report data structure that may include more detail is shown below with reference to Failure Report 2. The difference between this example implementation and the example implementation shown above with reference to Failure Report 1 is that there may be one more IE for indicating the associated logical channel Identity (or RLC bearer ID) and/or one more IE for indicating the associated (physical) cell ID.

| Failure Report 2 | |
| --- | --- |
| FailureReport | SEQUENCE { |
|     failureCG | ENUMERATED {MCG, SCG} |
|     LogicalChannelIdentity | INTEGER (1..maxLC-ID} |
|     PhysCellId | INTEGER (0..1007) |
|     failureType | ENUMERATED { t310-Expiry, randomAccessProblem, rlc-MaxNumRetx, scg-ChangeFailure, reconfigFailure, integrityFailure}, |
|     measResult | OCTET STRING (CONTAINING MeasResult-Failure) |

In the above Failure Report data structure if the failureType is set to randomAccessProblem, the cell ID may be included to indicate with which cell the UE has problem for random access. If the failureType is set to rlc-MaxNumRext, the logical Channel Identity (or the RLC bearer ID) may be present to indicate which RLC entity has reached the maximum number of retransmissions. It should be noted that the maxLC-ID is the maximum value of the logical channel ID (e.g., defined as 32 in the technical specification TS 38.331). The physCellID may identify the physical cell identity.

In some of the present implementations, if an MCG failure report is configured to the UE or allowed, a failure of the MN RRC messages (e.g., when an MCG link fails due to a reconfiguration failure), including an encapsulated SN RRC message (with or without any MCG reconfiguration fields) may trigger the MCG failure report. In the MCG failure report, in some of such implementations, the UE may indicate which part of the reconfiguration (e.g., the MN part or the SN part) has failed.

Figure 8:
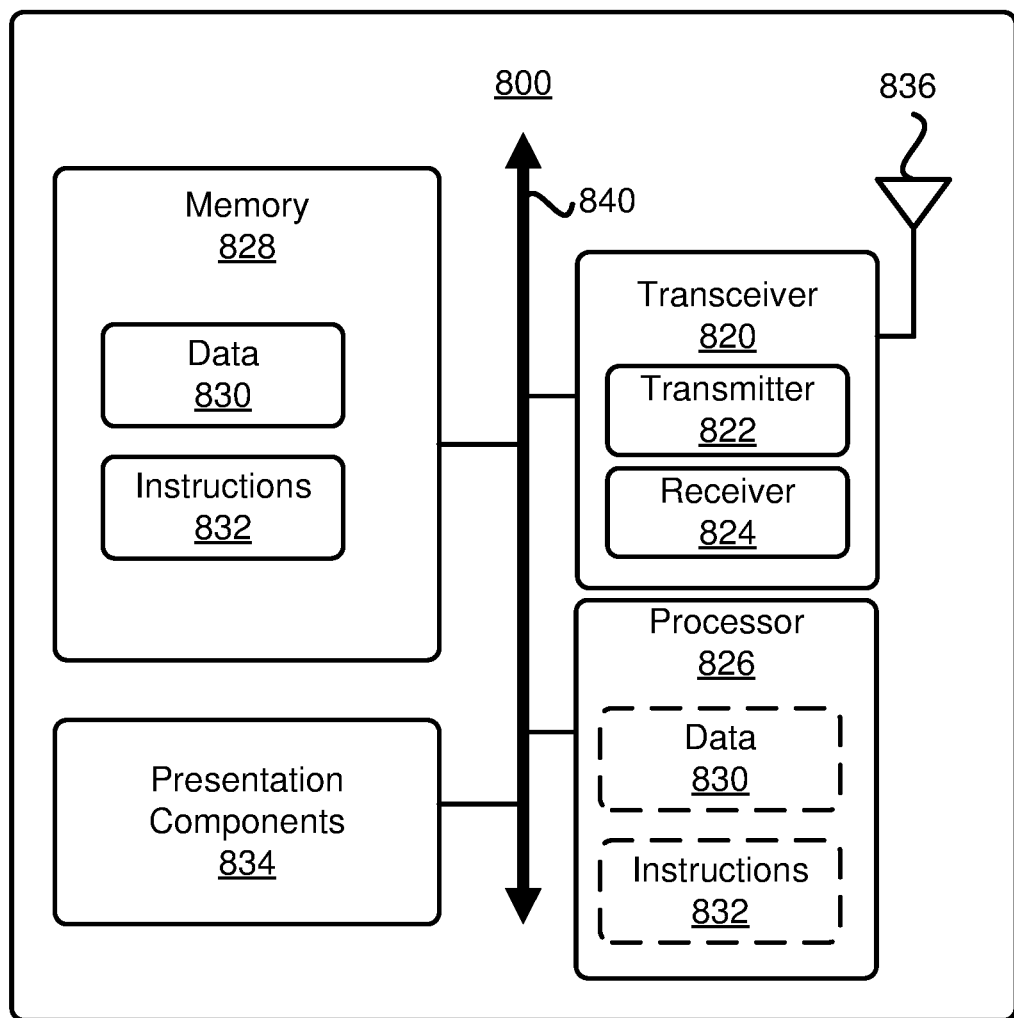
FIG. 8 illustrates a block diagram of a node for wireless communication, according to various aspects of the present application.

FIG. 8 illustrates a block diagram of a node for wireless communication, in accordance with various aspects of the present application. As shown in FIG. 8, node 800 may include transceiver 820, processor 826, memory 828, one or more presentation components 834, and at least one antenna 836. Node 800 may also include a Radio Frequency (RF) spectrum band module, a base station communications module, a network communications module, and a system communications management module, input/output (I/O) ports, I/O components, and power supply (not explicitly shown in FIG. 8). Each of these components may be in communication with each other, directly or indirectly, over one or more buses 840.

Transceiver 820 having transmitter 822 and receiver 824 may be configured to transmit and/or receive time and/or frequency resource partitioning information. In some implementations, transceiver 820 may be configured to transmit in different types of subframes and slots including, but not limited to, usable, non-usable and flexibly usable subframes and slot formats. Transceiver 820 may be configured to receive data and control signalings.

Node 800 may include a variety of computer-readable media. Computer-readable media can be any available media that can be accessed by node 800 and include both volatile and non-volatile media, removable and non-removable media. By way of example, and not limitation, computer-readable media may comprise computer storage media and communication media. Computer storage media includes both volatile and non-volatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 828 may include computer-storage media in the form of volatile and/or non-volatile memory. Memory 828 may be removable, non-removable, or a combination thereof. Exemplary memory includes solid-state memory, hard drives, optical-disc drives, and etc. As illustrated in FIG. 8, memory 828 may store computer-readable, computer-executable instructions 832 (e.g., software codes) that are configured to, when executed, cause processor 826 to perform various functions described herein, for example, with reference to FIGS. 1 through 8. Alternatively, instructions 832 may not be directly executable by processor 826 but be configured to cause node 800 (e.g., when compiled and executed) to perform various functions described herein.

Processor 826 may include an intelligent hardware device, for example, a central processing unit (CPU), a microcontroller, an ASIC, and etc. Processor 826 may include memory. Processor 826 may process data 830 and instructions 832 received from memory 828, and information through transceiver 820, the base band communications module, and/or the network communications module. Processor 826 may also process information to be sent to transceiver 820 for transmission through antenna 836, to the network communications module for transmission to a core network.

One or more presentation components 834 presents data indications to a person or other device. For example, one or more presentation components 834 include a display device, speaker, printing component, vibrating component, etc.

From the above description it is manifest that various techniques can be used for implementing the concepts described in the present application without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A method for a user equipment (UE) for reporting a master node (MN) failure, the method comprising:
   detecting a failure in a radio link to the MN;
   determining whether the UE is configured with a split signaling radio bearer (SRB);
   transmitting an MN failure report to the MN using a secondary node (SN) path of the split SRB after determining that the UE is configured with the split SRB;
   maintaining current measurement configurations received from the MN and the SN after determining that the radio link to the MN has failed; and
   continuing to perform measurements based on the configurations received from the MN and the SN.

2. The method of claim 1 further comprising:
   after determining that the radio link to the MN has failed, suspending MN transmission for all of SRBs and data radio bearers (DRBs); and
   resetting a medium access control (MAC) entity associated with the MN.

3. The method of claim 1, wherein determining that the radio link to the MN has failed comprises at least one of determining that a timer for detecting a physical layer problem has expired, detecting a random access problem, and determining that a maximum number of retransmissions of MN radio link control (RLC) has been reached.

4. The method of claim 1 further comprising:
   forgoing reestablishing a radio resource control (RRC) connection with the MN after determining that the radio link to the MN has failed.

5. The method of claim 1 further comprising:
   detecting that in addition to the radio link failure with the MN, a radio link to the SN has also failed; and
   reestablishing a radio link control (RRC) connection with the MN.

6. The method of claim 1, wherein the MN failure report comprises at least a failure cause and available measurement results.

7. The method of claim 1 further comprising:
   initiating a timer upon transmission of the MN failure report;
   determining that the timer has expired before receiving feedback from the MN; and
   reestablishing a radio link control (RRC) connection with the MN.

8. The method of claim 1 further comprising:
determining whether the UE is configured with an SRB type 3 (SRB3) after determining that the UE is not configured with the split SRB; and
transmitting the MN failure report using the SRB3 after determining that the UE is configured with the SBR3.

9. The method of claim 1 further comprising:
before determining that the radio link to the MN has failed, transmitting a capability message to the MN, the capability message for informing the MN that the UE supports the transmitting of the MN failure report.

10. The method of claim 1 further comprising:
before the transmitting of the MN failure report, receiving a reporting configuration from the MN, wherein the MN failure report is transmitted based on the received reporting configuration.

11. A user equipment (UE) comprising:
one or more non-transitory computer-readable media having computer-executable instructions for reporting a master node (MN) failure; and
at least one processor coupled to the one or more non-transitory computer-readable media, and configured to execute the computer-executable instructions to:
detect a failure in a radio link to the MN;
determine whether the UE is configured with a split signaling radio bearer (SRB);
transmit an MN failure report to the MN using a secondary node (SN) path of the split SRB after determining that the UE is configured with the split SRB;
maintain current measurement configurations received from the MN and the SN after determining that the radio link to the MN has failed; and
continue to perform measurements based on the configurations received from the MN and the SN.

12. The UE of claim 11, wherein the at least one processor is further configured to execute the computer-executable instructions to:
after determining that the radio link to the MN has failed, suspend MN transmission for all of SRBs and data radio bearers (DRBs); and
reset a medium access control (MAC) entity associated with the MN.

13. The UE of claim 11, wherein executing the computer-executable instructions to determine that the radio link to the MN has failed comprises executing the computer-executable instructions to at least one of determine that a timer for detecting a physical layer problem has expired, detect a random access problem, and determine that a maximum number of retransmissions of MN radio link control (RLC) has been reached.

14. The UE of claim 11, wherein the at least one processor is further configured to execute the computer-executable instructions to:
forgo reestablishing a radio resource control (RRC) connection with the MN after determining that the radio link to the MN has failed.

15. The UE of claim 11, wherein the at least one processor is further configured to execute the computer-executable instructions to:
detect that in addition to the radio link failure with the MN, a radio link to the SN has also failed; and
reestablish an RRC connection with the MN.

16. The UE of claim 11, wherein the MN failure report comprises at least a failure cause and available measurement results.

17. The UE of claim 11, wherein the at least one processor is further configured to execute the computer-executable instructions to:
initiate a timer upon transmission of the MN failure report;
determine that the timer has expired before receiving a feedback from the MN; and
reestablish a radio link control (RRC) connection with the MN.

18. The UE of claim 11, wherein the at least one processor is further configured to execute the computer-executable instructions to:
determine whether the UE is configured with an SRB type 3 (SRB3) after determining that the UE is not configured with the split SRB; and
transmit the MN failure report using the SRB3 after determining that the UE is configured with the SBR3.

19. The UE of claim 11, wherein the at least one processor is further configured to execute the computer-executable instructions to:
before determining that the radio link to the MN has failed, transmit a capability message to the MN, the capability message for informing the MN that the UE supports the transmitting of the MN failure report.

20. The UE of claim 11, wherein the at least one processor is further configured to execute the computer-executable instructions to:
before the transmitting of the MN failure report, receive reporting configuration from the MN, wherein the MN failure report is transmitted based on the received reporting configuration.

* * * * *